(12) United States Patent
De et al.

(10) Patent No.: US 11,524,920 B2
(45) Date of Patent: *Dec. 13, 2022

(54) OPTICAL FIBER COATING DIE WITH REDUCED WETTED LENGTH

(71) Applicant: Corning Incorporated, Corning, NY (US)

(72) Inventors: Sumitava De, Painted Post, NY (US); Robert Clark Moore, Wilmington, NC (US); Douglas Gregg Neilson, Wilmington, NC (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 111 days.

This patent is subject to a terminal disclaimer.

(21) Appl. No.: 17/112,192

(22) Filed: Dec. 4, 2020

(65) Prior Publication Data

US 2021/0087108 A1 Mar. 25, 2021

Related U.S. Application Data

(63) Continuation of application No. 15/868,029, filed on Jan. 11, 2018, now Pat. No. 10,882,782.

(Continued)

(51) Int. Cl.
  C03C 25/12 (2006.01)
  C03C 25/105 (2018.01)
  C03C 25/18 (2006.01)

(52) U.S. Cl.
  CPC ............ *C03C 25/105* (2013.01); *C03C 25/18* (2013.01)

(58) Field of Classification Search
  CPC ...... C03C 25/104; C03C 25/143; C03C 25/18
  See application file for complete search history.

(56) References Cited

U.S. PATENT DOCUMENTS

| 4,409,263 A | 10/1983 | Aloisio et al. |
| 5,127,361 A | 7/1992 | Matsuda et al. |

(Continued)

FOREIGN PATENT DOCUMENTS

| CN | 1169542 A | 1/1998 |
| CN | 204727776 U | 10/2015 |

(Continued)

OTHER PUBLICATIONS

Japanese Patent Application No. 2019-539911, Office Action dated Oct. 14, 2021, 10 pages (5 pages of English Translation and 5 pages of Original Copy), Japanese Patent Office.

(Continued)

*Primary Examiner* — Cynthia Szewczyk
(74) *Attorney, Agent, or Firm* — Amy T. Lang; Kevin L. Bray

(57) ABSTRACT

An optical fiber coating apparatus that provides increased gyre stability and reduced gyre strength, thereby providing a more reliable coating application process during fiber drawing includes a cone-only coating die having a conical entrance portion with a tapered wall angled at a half angle $\alpha$, wherein $2° \leq \alpha \leq 25°$, and a cone height $L_1$ less than 2.2 mm, and a cylindrical portion having an inner diameter of $d_2$, wherein $0.1 \text{ mm} \leq d_2 \leq 0.5 \text{ mm}$ and a cylindrical height of $L_2$, wherein $0.05 \text{ mm} \leq L_2 \leq 1.25 \text{ mm}$; a guide die having an optical fiber exit, the guide die disposed adjacent the cone-only coating die such that a wetted length ($L_5$) between the optical fiber exit of the guide die and the entrance of the cone-only coating die is from 1 mm to 5 mm; and a holder for holding the cone-only coating die and the guide die in a fixed relationship defining a coating chamber between the guide die and the cone-only coating die, the coating chamber having an inner radius $L_6$ from the optical fiber axis to an inner wall of the holder that is from 3 mm to 10 mm.

9 Claims, 8 Drawing Sheets

Related U.S. Application Data

(60) Provisional application No. 62/449,700, filed on Jan. 24, 2017.

(56) References Cited

U.S. PATENT DOCUMENTS

| | | |
|---|---|---|
| 6,030,658 A | 2/2000 | Tsuchiya et al. |
| 6,284,046 B1 | 9/2001 | Orita et al. |
| 2003/0108660 A1 | 6/2003 | Yuan |
| 2003/0136340 A1 | 7/2003 | Fujimaki et al. |
| 2015/0147467 A1 | 5/2015 | Moore et al. |
| 2016/0083293 A1 | 3/2016 | Okada |

FOREIGN PATENT DOCUMENTS

| | | |
|---|---|---|
| CN | 105263879 A | 1/2016 |
| CN | 105765430 A | 7/2016 |
| EP | 0858977 A1 | 8/1998 |
| EP | 1327614 A1 | 7/2003 |
| EP | 1452501 A1 | 9/2004 |
| JP | 04-124048 A | 4/1992 |
| JP | 10-226540 A | 8/1998 |
| JP | 2002-365451 A | 12/2002 |
| JP | 2003-183056 A | 7/2003 |
| JP | 2016-204241 A | 12/2016 |
| JP | 2017-500600 A | 1/2017 |
| RU | 2266265 C2 | 12/2005 |
| WO | 2014/196612 A1 | 12/2014 |
| WO | 2015/080881 A1 | 6/2015 |
| WO | 2016/089733 A2 | 6/2016 |

OTHER PUBLICATIONS

European Patent Application No. 18704123.1 Office Action dated May 6, 2020; 5 Pages; European Patent Office.

International Search Report and Written Opinion of the International Searching Authority; PCT/US2018/014834; dated Apr. 20, 2018, 9 pages; European Patent Office.

Chinese Patent Application No. 201880008309.1, Office Action dated May 21, 2021, 10 pages (5 pages of English Translation and 5 pages of Original Document), Chinese Patent Office.

Russian Patent Application No. 2019126639, Decision to Grant and Search Report dated Apr. 20, 2021, 20 pages (9 pages of English Translation and 11 pages of Original Document), Russian Patent Office.

OPTICAL FIBER COATING DIE WITH REDUCED WETTED LENGTH

This application is a continuation of U.S. patent application Ser. No. 15/868,029, filed on Jan. 11, 2018, which claims the benefit of priority under 35 U.S.C. § 119 of U.S. Provisional Application Ser. No. 62/449,700 filed on Jan. 24, 2017 the content of which is relied upon and incorporated herein by reference in its entirety.

FIELD OF THE DISCLOSURE

This disclosure pertains to optical fiber coating dies and methods of coating optical fiber.

BACKGROUND OF THE DISCLOSURE

Optical fibers, commonly used in telecommunications, are typically coated with one or more generally concentric polymeric coatings to protect the optical fiber from damage, such as from abrasion or moisture. These protective coatings, typically radiation curable (e.g., UV-curable), are applied as the fiber is being drawn. The drawn fiber is passed through one or more coating (or sizing) dies having a cylindrical land portion having a diameter greater than the diameter of the optical fiber. A liquid curable coating composition disposed above the cylindrical land portion is entrained by the fiber and pulled through the cylindrical land portion. It is important that the coating or multiple coatings are concentric with the fiber and have a uniform thickness (or diameter) along the length of the fiber. These attributes contribute to ease in splicing and connectorization of the fiber, thereby providing lower losses in an installed fiber application. Market demands place increasingly stringent tolerances on the diameter and concentricity of optical fiber coatings.

SUMMARY OF THE DISCLOSURE

Cone-only coating die designs are disclosed which have wetted length $L_5$ (defined as the distance between the exit of the guide die and entrance of the cone-only coating die) such that 1 mm≤$L_5$≤5 mm, coating chamber inner radius such that 3 mm≤$L_6$≤10 mm, cone half angle between 2°≤α≤25°, cone height $L_1$ between 0.25 mm and 2 mm; and a cylindrical land portion having an inner diameter of $d_2$ such that 0.1 mm≤$d_2$≤0.5 mm, and length $L_2$ such that 0.05 mm≤$L_2$≤1.25 mm. Such a die design results in a coating system having a smaller and more stable gyre that improves the stability of the coating application process.

As fiber draw speeds increase or the diameter of the sizing die decreases, more coating is rejected in the sizing die taper, and the gyre in the sizing die bell gets stronger. This leads to both increased instability of the fiber position, which causes an increase in coating offset, and increased incidence of flooding, which causes fiber breaks and increased costs. Reducing the size of the gyre by reducing the wetted length also reduces the amount of coating rejected by the die. Reducing the strength and size of the gyre suppresses the random motion of the fiber, allowing the centering forces to improve the offset. Cone-only die designs disclosed herein with the described wetted length and coating chamber inner diameter characteristics result in increased stability and reduced strength of the gyre, thereby resulting in a more stable and reliable coating application process in manufacturing, particularly for applications at draw speed ≥50 mps (meters per second).

DESCRIPTION OF THE ILLUSTRATED EMBODIMENTS

Figure 1:
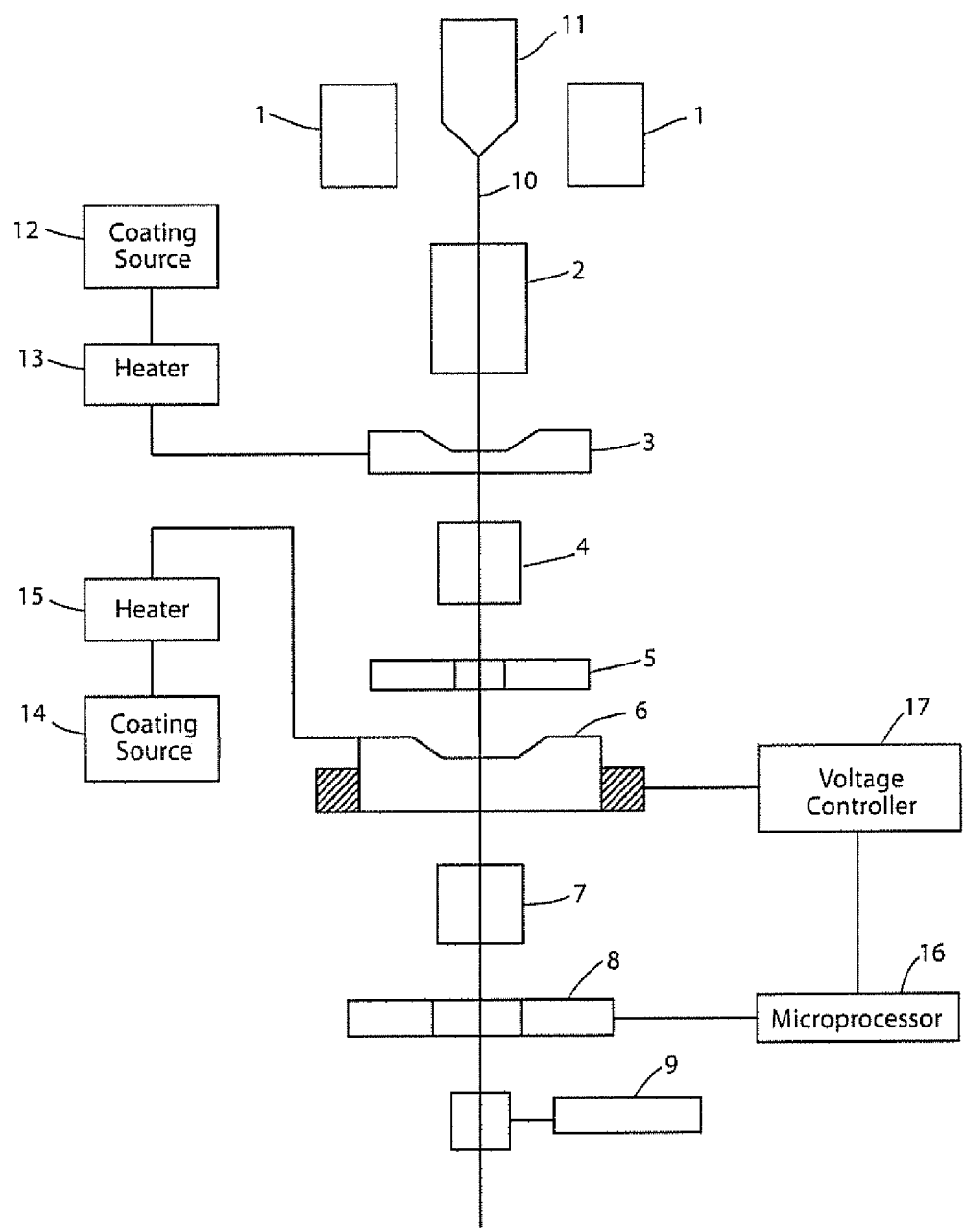
FIG. 1 is a schematic view of a fiber drawing and coating system used in the production of optical fibers.

A fiber drawing and coating system, used in the production of optical fibers, is shown in FIG. 1. Fiber 10 is drawn from preform 11 which is heated in furnace 1. Fiber 10 passes through fiber cooling device 2 and then through primary coater 3 where it is coated with a layer of primary coating material. The primary coating layer is cured in primary coating curing device 4, and the diameter of the fiber including the cured primary coating is measured by device 5. Curing device 4 typically comprises an irradiator array. Fiber 10 passes through secondary coater 6 where it is coated with a layer of secondary coating material that is cured in curing device 7 which is similar to curing device 4. The diameter of the fiber including the cured secondary coating is measured, for example by device 8. In some embodiments, fiber may also pass through an optional tertiary ink coater device where it is coated with a layer of ink coating material that is cured in curing device similar to curing devices 4 and 7. Tractor means 9 pulls the fiber 10 from furnace 1 and through the intermediate devices. The drawn fiber is typically taken up onto spools by a winder (not shown) for further processing. Coating material is supplied to coaters 3 and 6 from sources 12 and 14, respectively. The inlet or delivery temperature of the coating material can be maintained at a desired value by devices 13 and 15, respectively, which are in communication with the coating delivery line.

Alternatively, the fiber passes through the primary coater 3 and then through the secondary coater 6, without passing through a primary coating curing device 4 in between the two coaters. The second coating is applied directly on the primary coating before both coatings are cured. This is known as "wet-on-wet" or "WOW" application process.

Figure 2:
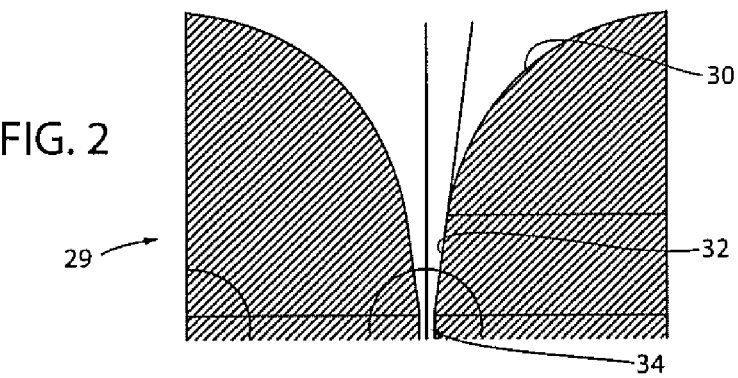
FIG. 2 is a schematic view of a conventional coating die having a bell-shaped opening.

FIG. 2 shows a conventional die 29 used to apply coating to optical fiber. Dies with this design, which is at least 25 years old, are widely available commercially from vendors such as Oberg, Sancliff and Nextrom. The die has a bell-shaped opening 30, at the base of which is a conical taper 32, followed by a straight land section 34. The coated diameter of the fiber is largely determined by the ratio of the fiber diameter to the land diameter, although it is also affected by the fiber temperature, the length and slope of the taper, the distance from the guide die to the sizing die, the coating viscosity, and other parameters known to those of skill in the art.

Figure 3:
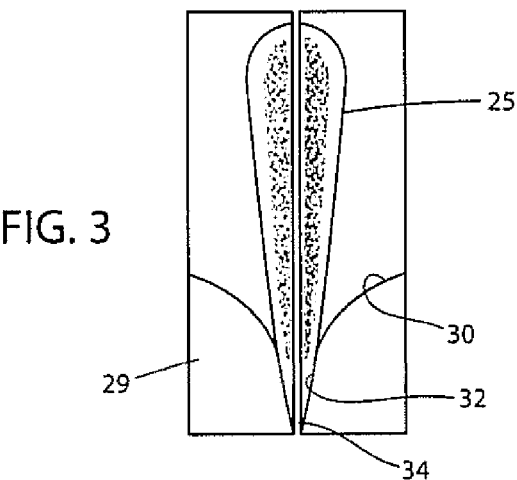
FIG. 3 shows the structure of a gyre in a conventional coating die.

During operation, the fiber entrains a boundary layer of coating, most of which is rejected in the bell and taper. The rejection causes pressures of as much as 800 psi to build up at the apex of the taper cone, and this pressure forces additional coating through the die land. The pressure also creates a very large force that centers the fiber in the die. The rejected coating forms a torus-shaped circulating cell, known as a vortex or gyre, in the region above the land, and this gyre is not stable. In FIG. 3 is shown the structure of the gyre 25 in a conventional coating die, with the gyre causing unstable behavior in the die.

The coating temperature in the vortex is elevated compared to the bulk temperature, owing to shear heating resulting from the very high shear rates in the vortex. Finite-element/finite-volume computer models indicate that the coating temperature near the middle of the vortex increases rapidly as the draw speed increases and may be as much as 80° C. higher than the coating feed temperature. The temperature increase is also greater for smaller sizing dies, because more coating is rejected, and for greater drawing speeds, because the gyre spins faster. Because the vortex is not stable, some of this hot coating can escape via an eddy current or other perturbation, and when the hot coating enters the taper region of the die, the centering forces are no longer axisymmetric. The unbalanced forces again result in poor fiber-coating offset, i.e., the distance between the axial center of the coating and the axial center of the optical fiber. Perhaps even more critically, the hot coating can migrate to the upper meniscus of the die. The lower viscosity of the hot coating makes the process more susceptible to flooding, that is, to dewetting of the fiber and the consequent flowing of coating past the fiber upward through the entry chamber of the die and out. When flooding occurs, the fiber typically breaks. Breaks require that the draw process be restarted, which can contribute significantly to the manufacturing cost.

Figure 4:
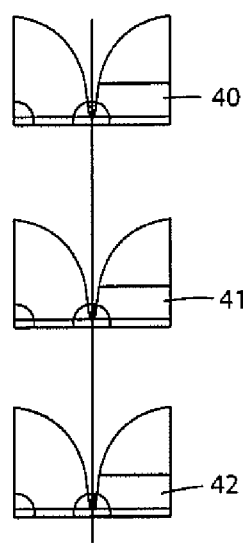
FIG. 4 is a schematic view of a conventional wet-on-wet apparatus having stacked guide and sizing dies.

Another problem addressed herein is the poor offset observed when two coatings are applied sequentially without curing, otherwise known as wet-on-wet application. A conventional wet-on-wet method is to stack standard dies together including a guide die 40, a first coating die 41 and a second coating die 42, as illustrated in FIG. 4.

Figure 5:
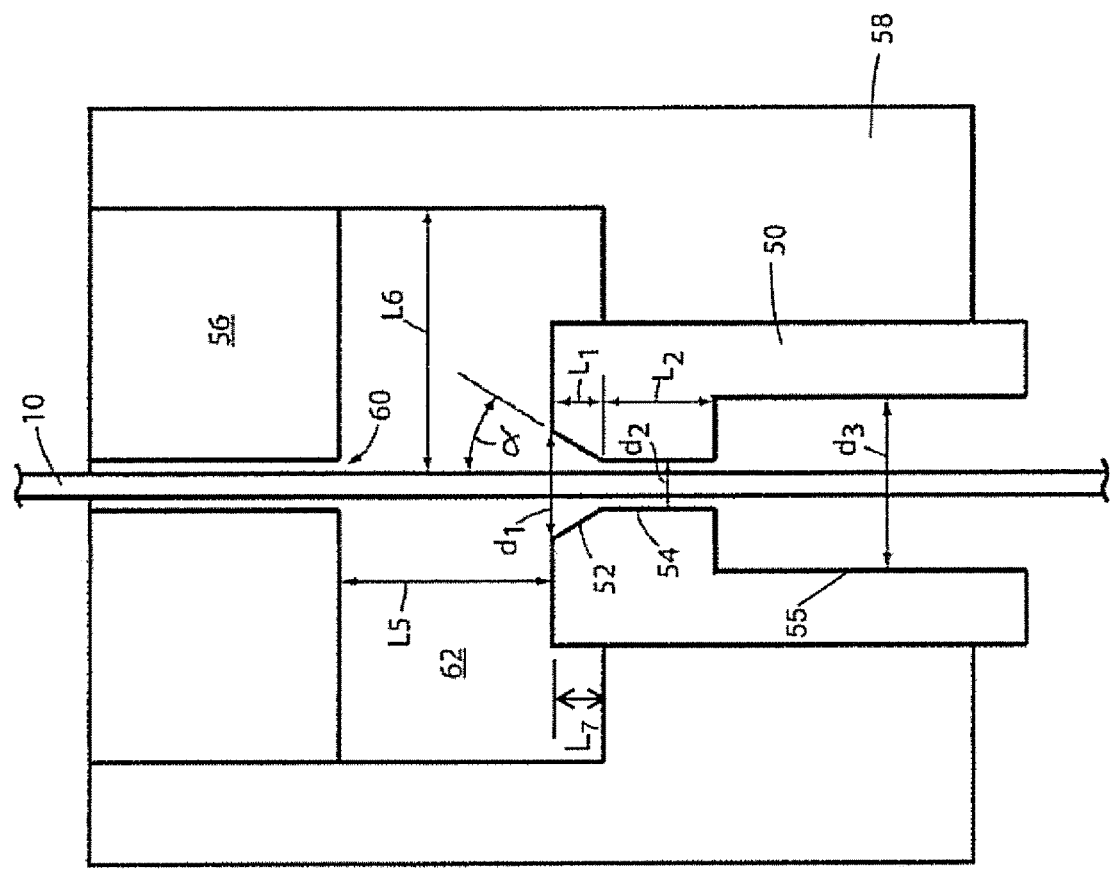
FIG. 5 is a schematic view of a cone-only die coating system in accordance with this disclosure.
Figure 6A:
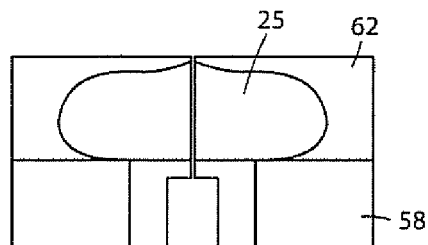
FIGS. 6A-6D show size and structure of gyres for different wetted lengths.
Figure 6B:
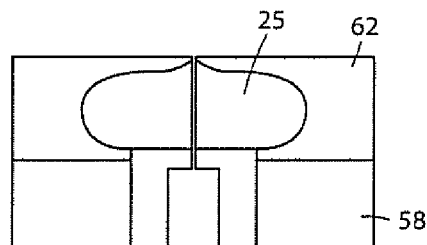
Figure 6C:
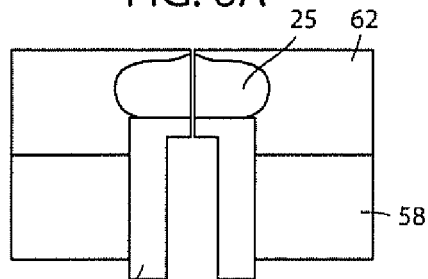
Figure 6D:
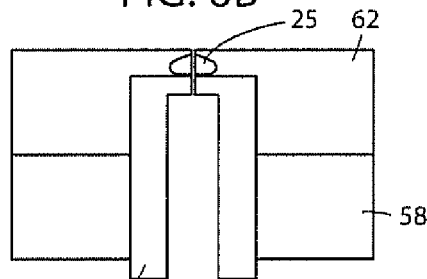
Figure 7A:
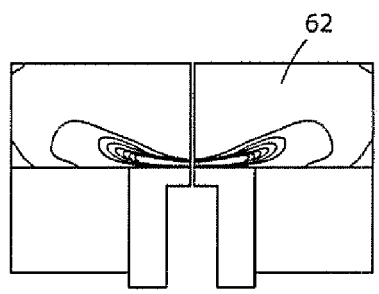
FIGS. 7A-7D show the radial velocity profiles for gyres for the different wetted lengths corresponding with FIGS. 6A-6D, respectively.
Figure 7B:
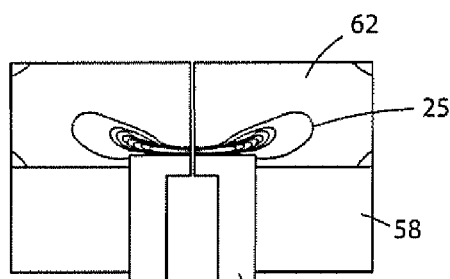
Figure 7C:
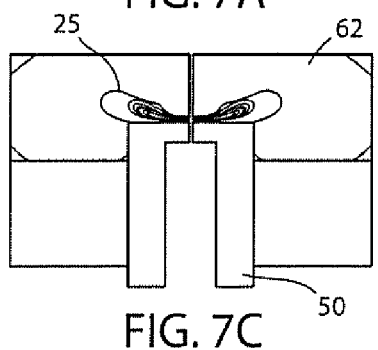
Figure 7D:
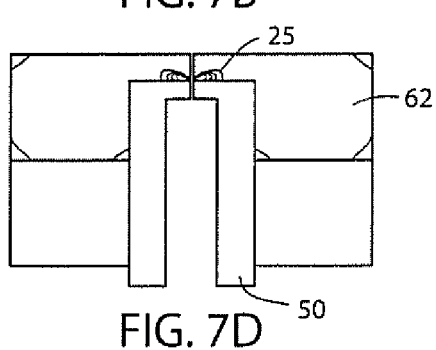

The offset (distance between the centerline of the fiber and the centerline of the coating) of both coatings is compromised with this method. The centering forces from the two dies are in competition with each other, and these forces are random to some extent, as the coating gyres in the two dies are chaotic and independent. Cone-only coating dies have been reported (US 20150147467) to reduce size and strength of coating gyre. As referred to herein a "cone-only die" is a sizing die that has a cone portion 52, but not the bell portion 30. A cone-only die has a cylindrical land portion 54 and may have an optional exit cylindrical leg portion 55, as shown in FIG. 5, an optional upper cylindrical leg portion (not shown), or both an exit cylindrical leg portion and an upper cylindrical leg portion. In the cone-only die embodiment shown in FIG. 5, the bell portion 30 (formed by the convex walls) of the standard die such as the one shown in FIG. 2 has been removed, and the cone region 52 and the cylindrical land region 54, as well as optional upper cylindrical leg portion 55 are retained. The cone region 52 preferably has a small height or length $L_1$ such $L_1 \leq 2.2$ mm, preferably $0.2$ mm $\leq L_1 \leq 2$ mm. For example, in some exemplary embodiments the height $L_1$ of the cone region 52 is 0.25 mm 0.3 mm, 0.4 mm, 0.5 mm, 0.6 mm, 0.75 mm, 1 mm, 1.2 mm, 1.3 mm, 1.4 mm, 1.5 mm, 1.7 mm, 1.75 mm, 1.8 mm, or there-between. More preferably, in order to reduce the size of the gyre, the height $L_1$ in certain embodiments is not greater than 2 mm, even more preferably $L_1 \leq 1.8$ mm, and most preferably $L_1 \leq 1.5$ mm. Preferably $L_1 \geq 0.25$ mm, more preferably $L_1 \geq 0.5$ mm, and even preferably $L_1 \geq 0.7$ mm. According to some embodiments, $0.9$ mm $\leq L_1 \leq 1.2$ mm.

Die designs are disclosed that include a conical ferrule with tapered wall, wherein the conical ferrule has a cross-section with inner walls angled at a half angle $\alpha$, where $2° \leq \alpha \leq 25°$, and cone height $L_1$ between 0.25 mm and 2 mm; and a cylindrical portion having an inner diameter of $d_2$ such that $0.1$ mm $\leq d_2 \leq 0.5$ mm, and length $L_2$ such that $0.05$ mm $\leq L_2 \leq 1.25$ mm, with the taper reducing the amount of liquid coating rejected by the die. It has further been determined herein that the performance of cone-only coating dies is also unexpectedly and materially influenced by the coating chamber inner diameter and wetted length. The wetted length is defined as the distance between the exit of the guide die and entrance of the cone-only die. Disclosed herein are cone-only coating die designs with wetted length and coating chamber inner diameter characteristics that result in increased stability and reduced strength of the gyre, thereby resulting in a more stable and reliable coating application process in manufacturing, particularly for applications at draw speed $\geq 50$ mps (meters per second).

As fiber draw speeds increase or the diameter of the sizing die decreases, more coating is rejected in the sizing die taper, and the gyre in the sizing die gets stronger. This leads to both increased instability of the coating process, which causes an increase in coating offset, and increased incidence of flooding, which causes fiber breaks and increased manufacturing costs.

In FIG. 5 is shown the schematic of a cone-only coating die coating system, wherein cone-only coating die 50 is held by die holder 58 and has a conical portion 52 having a cross-section with inner wall angled at a half angle $\alpha$, cone height $L_1$, cylindrical portion 54 having inner diameter $d_2$ and length $L_2$, with the wetted length in the coated chamber (defined as the distance between the exit 60 of the guide die and entrance of the cone die) as $L_5$ and inner radius of coating chamber 62 has $L_6$. In FIG. 6 is shown the size and structure of gyre 25 for different heights between the cone-only coating die 50 and the die holder 58 (also defined as proud height, $L_7$). The difference in height between the cone-only coating die 50 and the die holder 58 for the four cases shown correspond to the wetted lengths listed in the table below:

| FIGS. | Distance between Cone Die and Die Holder (Proud Height), $L_7$ (mils) | Wetted Length, $L_5$ (mm) |
|---|---|---|
| 6A, 7A | 1 | 4.98 |
| 6B, 7B | 23 | 4.42 |
| 6C, 7C | 70 | 3.22 |
| 6D, 7D | 150 | 1.19 |

Figure 8:
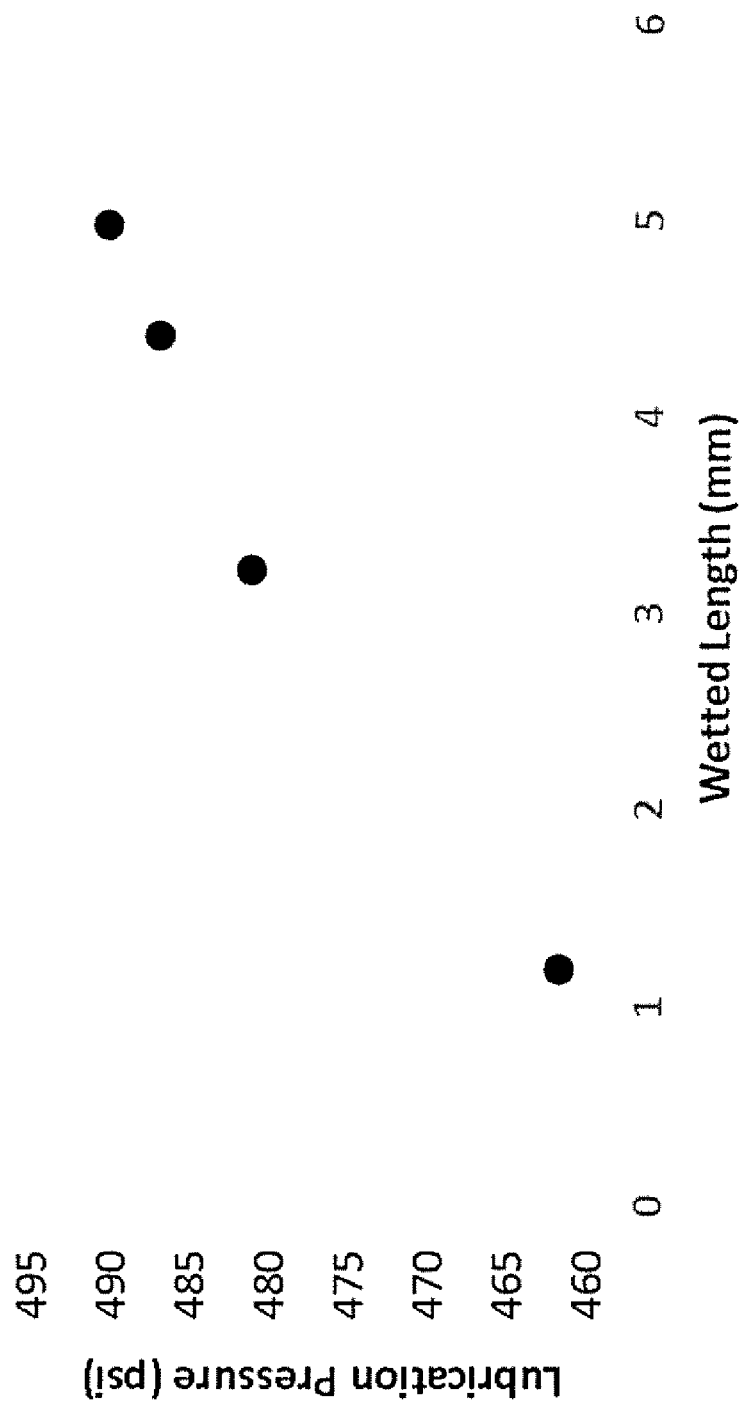
FIG. 8 is a graph showing the lubrication pressures for the four different wetted lengths of FIGS. 6A-6D and 7A-7D.
Figure 9:
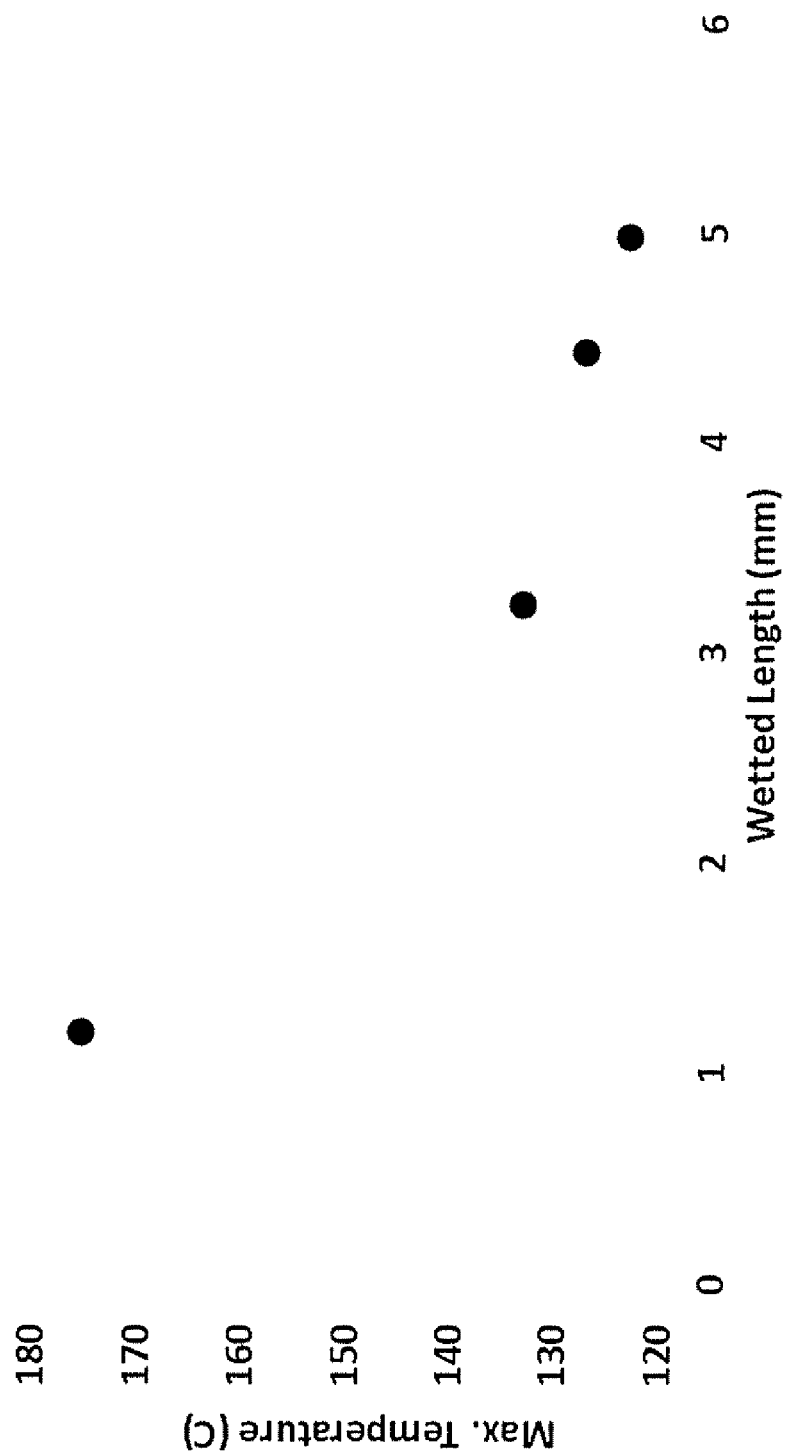
FIG. 9 is a graph showing the maximum temperatures for the four different wetted lengths of FIGS. 6A-6D and 7A-7D.
Figure 10:
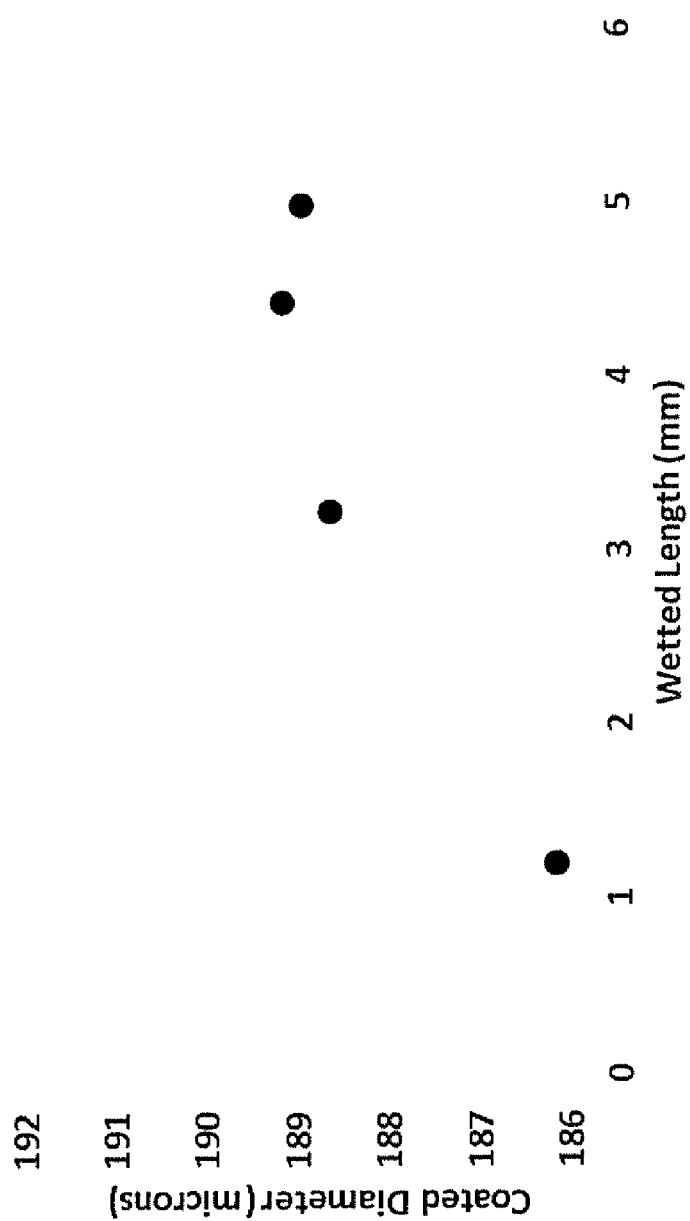
FIG. 10 is a graph showing the predicted coated diameters for the four different wetted lengths of FIGS. 6A-6D and 7A-7D.
Figure 11:
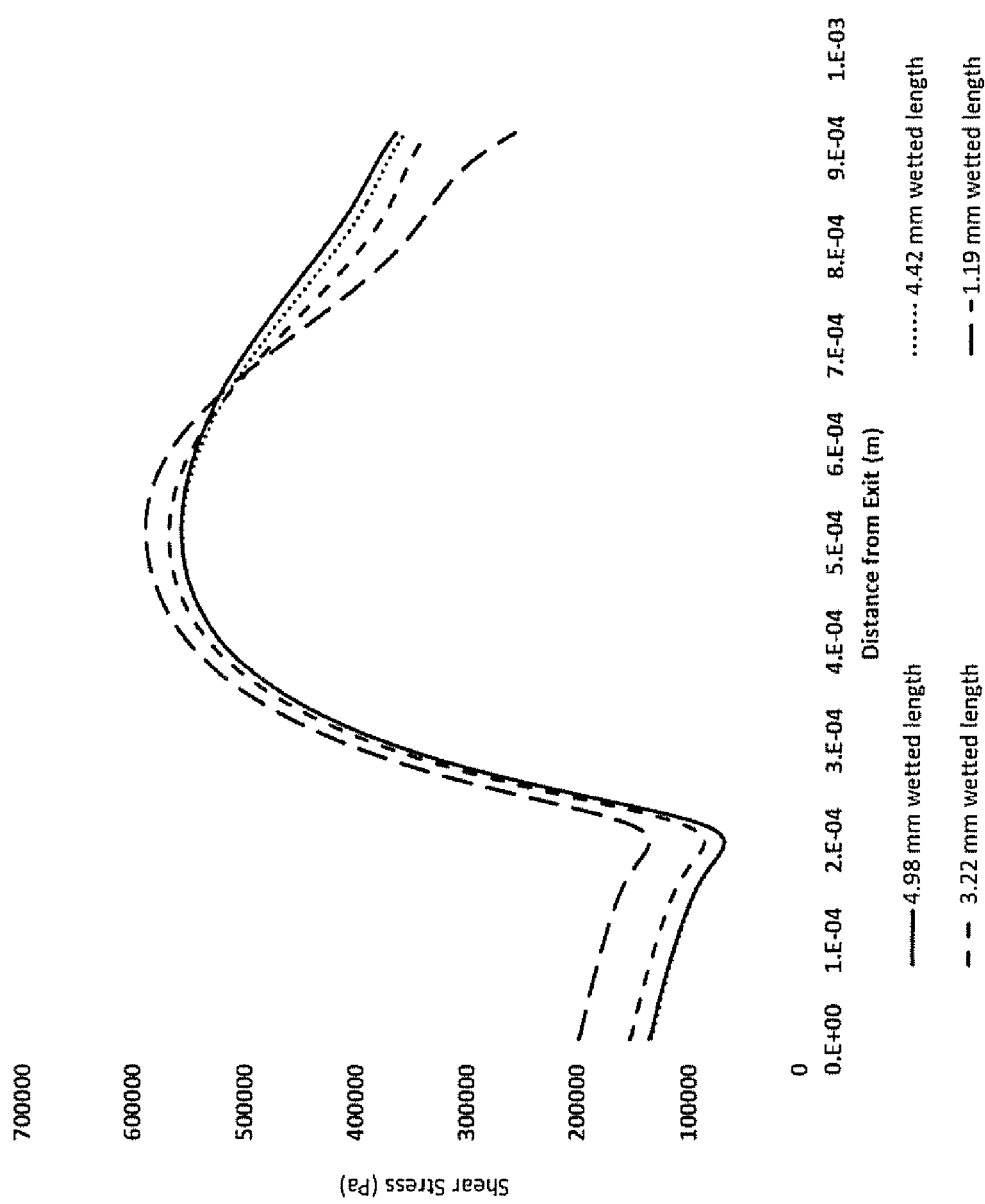
FIG. 11 is a graph showing the predicted shear stresses for the four different wetted lengths of FIGS. 6A-6D and 7A-7D.

As can be seen, the size of the gyre is significantly reduced with reduction in the wetted length. The contours represented in FIGS. 6A-D correspond to the gyre region in the coating die in which significant recirculation of the coating fluid occurs. The gyre contributes to the flow instability in the coating die and the reduction of the gyre results in a more stable and reliable fiber coating process. The calculations are shown for the case of coating chamber inner radius $L_6$ of 8.7 mm. Suitable dimensions for coating chamber inner radius $L_6$ are about 3 mm to 10 mm or about 7 mm to 9 mm. The corresponding positive component of the radial velocity profile is shown in FIG. 7, with the size and strength of the gyre significantly reduced with the reduction in wetted length. The lubrication pressure for the four cases shown in FIG. 8 is from about 460 psi to about 490 psi, with the lubrication pressure decreasing with decreasing wetted length. Lubrication pressure is defined as the fluid pressure at the transition point from the conical taper to the land region of the cone-only die. The lubrication pressure in a conventional design with similar dimensions, such as the design shown in FIG. 2, is about 566 psi, which is larger than the lubrication pressure for all the four cases shown in FIG. 8. In some embodiments, the lubrication pressure is less than 500 psi. In some other embodiments, the lubrication pressure is less than 450 psi. The maximum temperature in the gyre for the four cases is shown in FIG. 9. The maximum temperature in the gyre decreases as the wetted length increases. By controlling the wetted length, the maximum temperature in the gyre can be controlled to a temperature less than or equal to 175° C., or less than or equal to 155° C., or less than or equal to 140° C., or less than or equal to 130° C., or less than or equal to 115° C., or less than or equal to 100° C. In some embodiments, the maximum temperature in the gyre is a temperature in the range from 70° C.-175° C., or in the range from 100° C.-150° C., or a temperature in the range from 120° C.-140° C., or in the range from 120° C.-130° C. FIGS. 8 and 9 show that control of wetted length permits simultaneous control of lubrication pressure and the maximum temperature of the gyre. Lubrication pressure and maximum gyre temperature can accordingly be optimized for a particular coating material by controlling the wetted length of the cone-only coating die. The coated diameter and shear stresses applied on the surface of the fiber in the cone-only die taper and land regions predicted for the different wetted length designs are shown in FIGS. 10 and 11, respectively. Results shown in FIGS. 6-10 are for the following cone-only die design parameters: a=8°; $L_1$=0.7 mm; $L_2$=0.216 mm; $d_2$=0.216 mm and $d_3$=2.54 mm. The coated diameter refers to the outer diameter of the coating on the fiber, where the fiber has a diameter of 125 μm.

Cone-only coating die systems are disclosed here having die designs that includes a conical ferrule with tapered wall, wherein the conical ferrule has a cross-section with inner walls angled at a half angle α, where 2°≤α≤25°, and cone height $L_1$ between 0.25 mm and 2 mm; a cylindrical portion having an inner diameter of $d_2$ such that 0.1 mm≤$d_2$≤0.5 mm, and length $L_2$ such that 0.05 mm≤$L_2$≤1.25 mm, wetted length $L_5$ such that 1 mm≤$L_5$≤5 mm (e.g., $L_5$≤4.5 mm, or $L_5$<3.5 mm or $L_5$<1.5 mm, or 1 mm≤$L_5$≤4 mm, or 1 mm≤$L_5$≤3 mm, or 1.5 mm≤$L_5$≤4 mm) and coating chamber inner radius $L_6$ such that 3 mm≤$L_6$≤10 mm, or 3.5 mm≤$L_6$≤9.5 mm, or 4 mm≤$L_6$≤9 mm, or 4.5 mm≤$L_6$≤8.5 mm, or 5 mm≤$L_6$≤10 mm, or 6 mm≤$L_6$≤9.5 mm or 7 mm≤$L_6$≤9 mm.

In an embodiment, a process of coating an optical fiber during a fiber draw process is disclosed wherein the optical fiber is drawn at a draw speed $V_d$ and the process of coating the optical fiber comprises passing the drawn optical fiber through a guide die and thereafter through a cone-only coating die, the cone-only coating die having a temperature $T_{die}$ and conical entrance portion with a tapered wall angled at a half angle α, wherein 2°≤α≤25°, and a cone height $L_1$ between 0.25 and 2 mm, and a cylindrical portion having an inner diameter of $d_2$, wherein 0.1 mm≤$d_2$≤0.5 mm and a cylindrical height of $L_2$, wherein 0.05 mm≤$L_2$≤1.25 mm, the guide die having an optical fiber exit, the guide die disposed adjacent the cone-only coating die such that a wetted length $L_5$ between the optical fiber exit of the guide die and the entrance of the cone-only coating die is from 1 mm to 5 mm, the cone-only coating die and the guide die being held in a fixed relationship by a holder to define a coating chamber between the guide die and the cone-only coating die, the coating chamber having an inner radius $L_6$ from the optical fiber to an inner wall of the holder that is from 3 mm to 10 mm, the coating chamber holding a liquid coating composition that is entrained on a surface of the optical fiber as the optical fiber is drawn through the cone-only coating die resulting in a coating thickness of liquid coating composition of $d_{coat}$ on the surface of the optical fiber. In one embodiment, the draw speed $V_d$ is larger than 45 m/s. In another embodiment, the draw speed $V_d$ is larger than 50 m/s. In another embodiment, the draw speed $V_d$ is larger than 60 m/s. In some embodiments, the ratio of wetted length, $L_5$, to draw speed, $V_d$, is in the range from 0.01 msec to 0.15 msec. In other embodiments, the ratio of wetted length, $L_5$, to draw speed, $V_d$, is in the range from 0.025 msec to 0.125 msec.

In some embodiments, the cone-only coating die is a primary coating die with the liquid coating composition as the primary coating composition. In these embodiments, the thickness of the primary coating composition on the surface of the optical fiber, $d_{coat}$, is between 10 microns and 50 microns. In other embodiments, the cone-only coating die is a secondary coating die with the liquid coating composition as the secondary coating composition. In these embodiments, the thickness of the secondary coating composition on the surface of the optical fiber, $d_{coat}$, is between 10 microns and 50 microns. In some embodiments, the cone-only coating die is an ink coating die with the liquid coating composition as the tertiary ink coating composition. In these embodiments, the thickness of the tertiary ink coating composition on the surface of the optical fiber, $d_{coat}$, is between 2 microns and 10 microns.

In some embodiments, the wall temperature of the cone-only coating die, $T_{die}$, is between 25° C. to 75° C. In other embodiments, the temperature of the cone-only coating die, $T_{die}$, is between 40° C. to 70° C. The fiber temperature entering the cone-only coating die is preferably between 40° C. to 85° C. In some embodiments the coating is delivered to the die at a temperature of greater than 35° C. In other embodiments, the coating is delivered to the die at a temperature of greater than 45° C. In still other embodiments, the coating is delivered to the die at a temperature of greater than 55° C.

The liquid coating compositions are preferably UV curable acrylate compositions. In some embodiments, the liquid coating composition entrained on the surface of the optical fiber is cured downstream using a light emitting diode (LED) UV source having an emission spectrum with a peak wavelength in the range between 300 nm-450 nm.

The described embodiments are preferred and/or illustrated, but are not limiting. Various modifications are considered within the purview and scope of the appended claims.

What is claimed is:

1. An optical fiber coating apparatus comprising:
a cone-only coating die having a conical entrance portion with a tapered wall angled at a half angle $\alpha$, wherein $2° \leq \alpha \leq 25°$, and a cone height $L_1$ less than 2.2 mm, and a cylindrical portion having an inner diameter of $d_2$, wherein $0.1 \text{ mm} \leq d_2 \leq 0.5 \text{ mm}$ and a cylindrical height of $L_2$, wherein $0.05 \text{ mm} \leq L_2 \leq 1.25 \text{ mm}$;
a guide die having an optical fiber exit, the guide die disposed adjacent the cone-only coating die such that a wetted length $L_5$ between the optical fiber exit of the guide die and a cone portion of the cone-only coating die is between 1 mm and 5 mm; and
a holder for holding the cone-only coating die and the guide die in a fixed relationship defining a coating chamber between the guide die and the cone-only coating die, the coating chamber having an inner radius $L_6$ from the optical fiber axis to an inner wall of the holder that is from 6 mm to 10 mm.

2. The apparatus of claim 1, wherein the inner radius $L_6$ is from 6 mm to 9.5 mm.

3. The apparatus of claim 2, wherein the inner radius $L_6$ is from 7 mm to 9 mm.

4. The apparatus of claim 1, wherein the wetted length $L_5$ is less than 4.5 mm.

5. The apparatus of claim 1, wherein the wetted length $L_5$ is less than 3.5 mm.

6. The apparatus of claim 1, wherein the cone height $L_1$ is between 0.25 mm and 2.0 mm.

7. The apparatus of claim 1, wherein the cone-only coating die is configured to have a lubrication pressure that is less than 500 psi.

8. The apparatus of claim 1, wherein a gyre that is formed in the coating chamber is configured to have a maximum temperature that is less than 175° C.

9. The apparatus of claim 8, wherein the gyre is configured to have a maximum temperature that is less than 100° C.

* * * * *